United States Patent Office 3,297,590
Patented Jan. 10, 1967

3,297,590
PYROPHORIC LEAD COMPOSITION AND METHOD OF MAKING IT
Sidney Toby, New Brunswick, and Joseph Charles, Jersey City, N.J., assignors to Research Corporation, New York, N.Y., a non-profit corporation of New York
No Drawing. Filed Mar. 23, 1965, Ser. No. 442,160
3 Claims. (Cl. 252—447)

This invention relates to a novel pyrophoric lead composition of high pyrophoric activity and to a method of making it.

The new pyrophoric lead compositions are made by heating lead citrate slowly to a temperature of about 250° C. while evacuating gaseous decomposition products until the rate of production of gaseous decomposition products substantially subsides and thereafter heating the residue to a temperature of from about 350° to about 500° C. The rate of heating during the primary decomposition should be adjusted so that the evacuation system can remove the gaseous decomposition products substantially as fast as they are formed without substantial carrying away of the solid reactant or the solid reaction product.

The reactive pyrophoric products thus obtained are black powders and appear to consist principally of finely divided metallic lead adsorbed on a carbon matrix in a lead to carbon ratio of from about 4 to 1 to about 5 to 1. In general, the products contain about 80% by weight of lead and about 20% by weight of carbon, the percentage by volume of carbon thus being about 60%. The pyrophoric products obtained when the primary decomposition products are heated to between about 350° and about 500° C. are very active, giving sparks and flames when poured into air and showing very rapid absorption of oxygen, the total absorption being about 6% by weight or more than a hundred-fold absorption by volume. The rate of absorption varies with the temperature of the final heating being at a maximum when the final heating temperature is about 400° C.

Because of their high activity the pyrophoric products of the invention should be kept in sealed containers until used. The pyrophoric products are particularly useful for removing oxygen from gases such as nitrogen, hydrogen and hydrocarbons both for purification of gases and for analytical purposes.

The following specific example is illustrative of the principles of the invention:

Local citrate was slowly heated to about 260° C. over a period of about 2 hours while evacuating the products of decomposition as rapidly as they are formed. The temperature was then raised to about 400° C. while continuing evacuation until the pressure has fallen to about $10^{-3}$ mm. of Hg. The product was then cooled to room temperature and sealed off in glass tubes.

The product showed an oxygen absorption of about 150 volumes at STP. When a small amount of the product was exposed to oxygen at 1000 microns of Hg pressure in a system having a volume of 560 cm.$^3$ the pressure dropped to 10 microns in about 275 seconds. A similar product which had been made by the same procedure except that the final temperature of heating was about 500° took about 500 seconds to effect the same pressure drop.

We claim:
1. A method of making pyrophoric lead compositions which comprises heating lead citrate to about 250° C. while evacuating gaseous products of decomposition and thereafter heating the solid residue to a temperature from about 350° to about 500° C.
2. A method of making pyrophoric lead compositions which comprises heating lead citrate to about 250° C. while evacuating gaseous products of decomposition and thereafter heating the solid residue to a temperature of about 400° C.
3. A pyrophoric lead composition consisting of a finely divided solid decomposition product of lead citrate containing metallic lead and carbon in a ratio of from about 4 to 1 to about 5 to 1 by weight and having a high rate of absorption of oxygen in a volume ratio of at least 100 to 1.

References Cited by the Examiner
UNITED STATES PATENTS
3,123,567  3/1964  Ruelle et al. _____ 252—447 X OSCAR R. VERTIZ, Primary Examiner.

A. GREIF, Assistant Examiner.